United States Patent [19]
Warkotsch

[11] Patent Number: 4,918,986
[45] Date of Patent: Apr. 24, 1990

[54] QUICK-CLAMPING FIXTURE WITH CENTERING FEATURE FOR CLAMPING VEHICLE WHEELS ON THE SPINDLE OF A BALANCING MACHINE

[76] Inventor: Horst Warkotsch, Schulze-Delitzsch-Str. 21, 3006 Burgwedel 1, Fed. Rep. of Germany

[21] Appl. No.: 306,709

[22] Filed: Feb. 6, 1989

[30] Foreign Application Priority Data

Mar. 16, 1988 [DE] Fed. Rep. of Germany ....... 3808755

[51] Int. Cl.[5] ............................................. G01M 01/02
[52] U.S. Cl. ..................................... 73/487; 269/48.1
[58] Field of Search ................. 73/987, 485; 269/48.1; 29/273

[56] References Cited

U.S. PATENT DOCUMENTS

| | | | |
|---|---|---|---|
| 3,761,008 | 9/1973 | Goulder | 269/48.1 |
| 4,118,989 | 10/1978 | Wood | 73/487 |
| 4,354,386 | 10/1982 | Newton | 73/487 |

FOREIGN PATENT DOCUMENTS 2607506   8/1977   Fed. Rep. of Germany ..... 269/48.1

Primary Examiner—Hezron E. Williams
Assistant Examiner—Robert P. Bell
Attorney, Agent, or Firm—Allegretti & Witcoff, Ltd.

[57] ABSTRACT

A quick-clamping fixture for centering and clamping vehicle wheels on the spindle of a balancing machine, having a flange affixed to the spindle against which the cylindrical opening in the center section of a vehicle wheel is seated. A spring loaded conical fixture fits into the center opening of the wheel, and biases the conical fixture in the direction of said opening. The conical fixture is configured like a two part clamping collet the outer part having an external cylindrical surface for insertion into the centering opening of the vehicle wheel. One part of the clamping collet has a contact surface engaged by the spring, and the other has a contact surface for abutting a counterbearing. Precision centering takes place at the cylindrical inner surface of the wheel center section when the outer part of the collet expands as its conical surface slides against the complementary conical surface of the inner part. There are no centering errors due to the presence of play arising from mechanical tolerances.

4 Claims, 1 Drawing Sheet

4,918,986

# QUICK-CLAMPING FIXTURE WITH CENTERING FEATURE FOR CLAMPING VEHICLE WHEELS ON THE SPINDLE OF A BALANCING MACHINE

BACKGROUND OF THE INVENTION

The invention concerns a quick-clamping fixture having an accurate centering means for clamping vehicle wheels on the spindle of a balancing machine.

THE PRIOR ART

A quick-clamping fixture of the type involved here is known under the company proprietary designation "Universal-Schnell spannvorrichtung fur Mittenzentrierung" of the firm of Gebr. Hofmann GmbH & Co. KG in D-6102 Pfungstadt, FRG, printing date 09-77, and having Order No. 335/68 for the fixture. Here the conical arrangement consists simply of a cone whose tapered end faces the wheel to be centered and whose rear face is supported on a spring bearing upon the base of a domed portion of the flange. The clamping mechanism has a clamping nut that may be screwed onto a threaded end of the spindle and a pressure head that extends beyond the cone, the edge of which serves to fasten the wheel on the flange. Cones of differing diameters are provided for use with different wheel center sections having centering openings of varying diameters.

When clamping a vehicle wheel, first the central centering opening contacts the conical surface of the cone for seating; upon further tightening of the clamping nut the cone slides along the wheel on the spindle, whereby the spring presses the cone firmly into the centering opening, thus effecting centering. Upon completion of the clamping procedure, the pressure head of the clamping nut presses the wheel firmly against the flange.

This known quick centering device has the disadvantage that the conical centering surface of the centering cone does not truly seat on the cylindrical centering surface of the centering opening, but rather on its edge, reducing centering accuracy. Furthermore, centering accuracy is adversely affected by unavoidable play between the centering cone and the spindle of the balancing machine.

Centering rings that have been ground for very tight mating tolerances with the opening in the wheel are also known. The use of such centering rings does produce seating of the centering surface on the locating inner surface of the centering opening of the wheel, but three mechanical tolerances, namely the external and internal tolerances of the centering rings, plus the tolerance of the spindle of the balancing machine accumulate. These tolerances can add to produce a large total tolerance, so that unsatisfactory overall errors will result from the balancing procedure.

THE INVENTION

The object of the invention is to provide a quick-clamping fixture with centering feature of the type described which performs centering by using the cylindrical inner surface of the centering opening of the center section of the wheel to be balanced, and which significantly reduces centering tolerances.

The object of the invention is achieved by providing a conical arrangement in the manner of a clamping collet, the operation of which is not for the purpose of conventional clamping, but exclusively for centering.

The clamping is performed in the known manner used for quick-clamping fixtures for balancing machines through employment of a fixed flange against which the wheel is pressed. Known clamping collets are not tightened by springs. In accordance with this invention, a spring provides for the limitation of centering forces, and ensures that centering results from the expansion of the clamping collet as the vehicle wheel is moved against the spring using the conventional clamping nut. The point at which the clamping collet centers the wheel occurs prior to the point at which the wheel is clamped against the fixed flange due to centering tolerances that must be taken up by the conical portions of the collet.

Centering using the clamping collet is virtually devoid of tolerance effects, since once the wheel center section has been centered no play is present. The two conical parts or components of the clamping collet may readily be fabricated to high degrees of rotational symmetry, and their radial tolerances are irrelevant.

If vehicle wheels having centering openings of various diameters are to be centered, it is necessary only to replace the clamping collet arrangement with another having an appropriate outer diameter which fits the cylindrical opening in the wheel.

Operation of the clamping collet requires application of a force. That is provided by a spring. The spring and the other components of the clamping collet must abut counterbearings. There are several possibilities here. In one embodiment the counterbearing is the center section of the vehicle wheel and the end of the spring toward the clamping collet bears against a flange attached to the spindle.

In another embodiment the counterbearing is the flange attached to the spindle, and the spring is disclosed on the opposite side of the wheel, with the end of the spring toward the clamping collet bearing against the wheel clamping device.

The collet seating surface for mating with the center section of the vehicle wheel should preferably be located on a radial flange on the cylindrical outer surface of the outer component of the two piece clamping collet. The centering action will then only occur after the wheel and its centering opening are securely positioned on the cylindrical outer surface of the clamping collet.

THE DRAWINGS

Examples of some of the various possible configurations will be described in greater detail with reference to the drawings in which FIG. 1 is a cross-sectional longitudinal view of the quick-clamping fixture of the invention, and FIG. 2 is a similar view of a modification of the fixture shown in FIG. 1.

DETAILED DESCRIPTION

Figure 1:
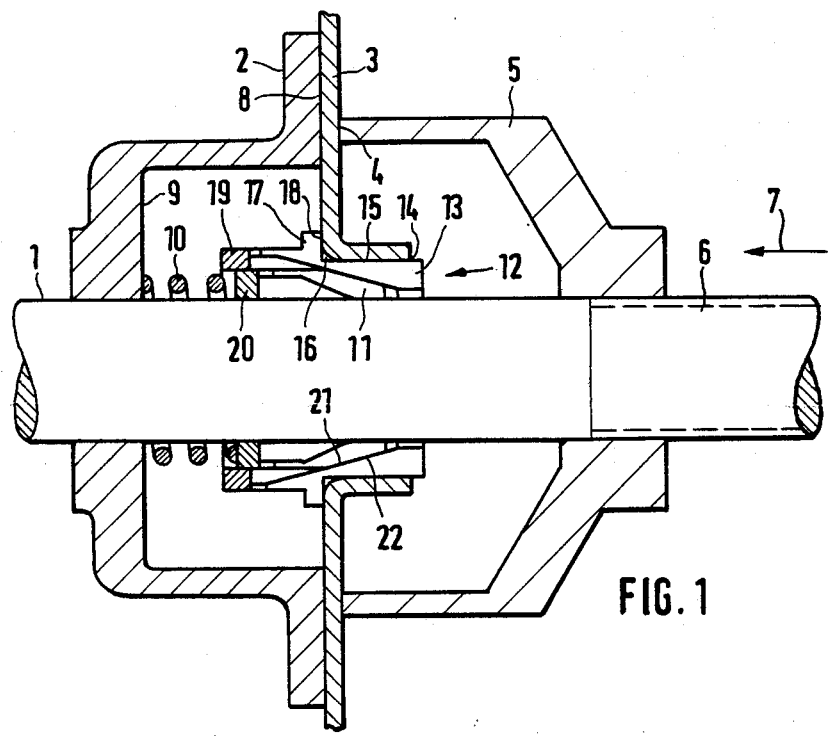

FIG. 1 shows the spindle 1 of a balancing machine (not illustrated). A hub-like flange 2 fixedly seated on the spindle is abutted by the center section 3 (partially illustrated only) of a vehicle wheel. The annular wheel portion 3 is pressed by end 4 of cup-shaped pressure head 5, which in turn is urged in the direction of arrow 7 by a tensioning nut (not shown) screwed onto external threads 6 of spindle 1. The wheel center section 3 is thus in contact with, and firmly seated on, seating surface 8 on fixed flange 2.

A spring 10 is compressed between the end of internal part or component 11 of the two-part clamping collet 12 and the base 9 of the hub-like flange 2 fixed to spindle 1. The outer part or component 13 of the collet 12 has a cylindrical outer surface 14 over which the inner cylindrical surface 15 of center opening 16 of wheel section 3 slides.

A radial flange 17 on the outer piece 13 of the collet abuts wheel center section 3 at its axial mating surface 18, thus providing the reactive force countering spring 10.

Parts 11 and 13 of clamping collet 12 have ring-shaped components 20 and 19, from each of which extend slotted components to the right in the drawing. Inner part 11 has a conical outer surface 21 and outer part 13 has a complementary conical inner surface 22, which surfaces slide over each other. the slotted component of inner part 11 of clamping collet 12 fits snugly on spindle 1, while cylindrical outer surface 14 of part 13 seats snugly on inner surface 15 of opening 16 in wheel center section 3. Since there is no play between the sliding conical surfaces 21 and 22, there is no longer any play at all present when the wheel is centered.

In clamping the wheel on spindle 1, firstly wheel center section 3 with its centering opening 16 is pushed onto cylindrical outer surface 14, whose diameter at this point is less than the diameter of inner surface 15. Wheel center section 3 is then translated in the direction of arrow 7 until said wheel center section 3 abuts surface 18 of flange 17. Continued movement in the direction of arrow 7 causes the piece 11 of clamping collet 12 to compress spring 10. Simultaneously conical inner surface 22 slides over complementary conical outer surface 21, thus opening or expanding the clamping collet to effect centering of the wheel on the collet 12. The final movement of wheel center section 3 is effected by pressure head 5 acting in conjunction with the clamping nut on the spindle, until end 4 of pressure head 5 forces wheel center section 3 firmly against surface 8 of fixed flange 2.

Figure 2:
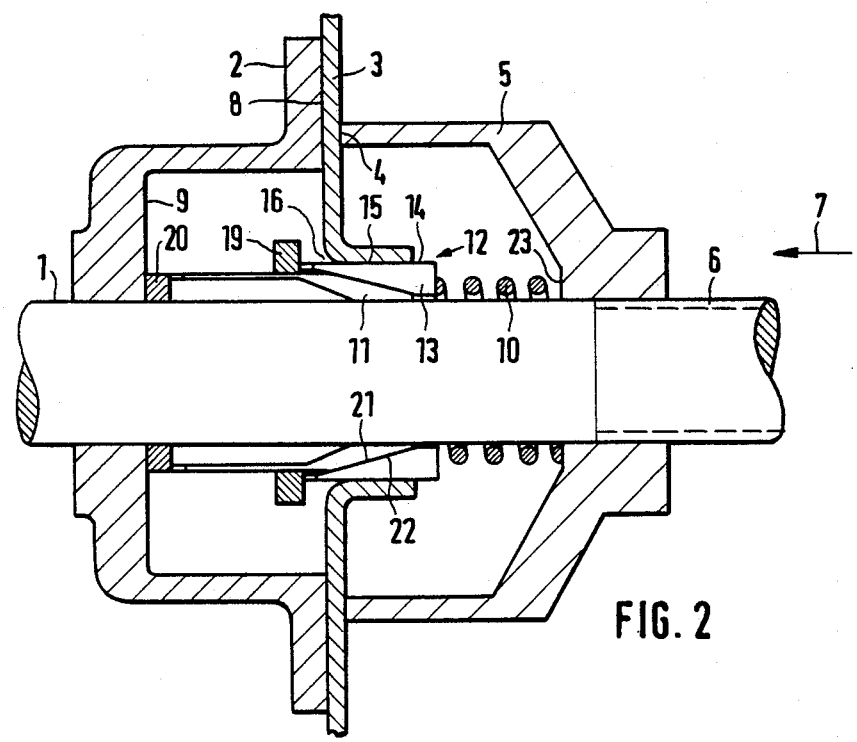

FIG. 2 shows a variation of the configuration shown in FIG. 1. Identical or similar components are indication by identical reference numbers. The difference here is that upper component 11 of the clamping collet with its U-shaped portion 20 bears against base 9 of fixed flange 2, while spring 10, on the other side of the wheel, bears against base 23 of pressure head 5 and the end of outer part 13 of collet 12. In this configuration, flange 17 is absent, so that inner component 11 of clamping collet 12 does not move axially during the centering procedure.

What is claimed is:

1. In a quick-clamping fixture having centering means for clamping a vehicle wheel on the spindle of a balancing machine comprising
   a flange fixed to said spindle for contact with the center portion of said vehicle wheel,
   a nut threaded on said spindle for moving said wheel toward said fixed flange,
   a clamping collet slidably mounted on said spindle which fits inside a flanged cylindrical opening in said center portion of said vehicle wheel, and
   a spring on said spindle for urging said clamping collet into engagement with said cylindrical opening in said wheel, the improvement in which
   said clamping collet is a two part collet having an inner part with an outer conical surface and an outer part with a complementary inner conical surface which surfaces slide over each other as the parts are urged toward each other by said spring to expand the collet
   said outer part having an external cylindrical surface which
   mates with said flanged cylindrical opening in said center
   portion of said vehicle wheel,
   one of said collet parts having a contact surface for abutting
   said spring and the other of said collet parts having a surface
   abutting a counterbearing.

2. The fixture of claim 1 in which said counterbearing in said center portion of said wheel and said spring is interposed between said clamping collet and said fixed flange.

3. The fixture of claim 1 in which said counterbearing is said fixed flange and said spring is interposed between said clamping collet and said nut.

4. The fixture of claim 2 in which said outer part of said two-part collet has an outwardly projecting radial flange which abuts said center portion of said vehicle wheel.

* * * * *